United States Patent [19]
Kojima et al.

[11] Patent Number: 5,397,113
[45] Date of Patent: Mar. 14, 1995

[54] VIBRATION ISOLATION APPARATUS

[75] Inventors: Hiroshi Kojima, Yokohama; Kazuya Takano, Kamakura, both of Japan

[73] Assignee: Bridgestone Corporation, Tokyo, Japan

[21] Appl. No.: 836,876

[22] Filed: Feb. 19, 1992

[30] Foreign Application Priority Data

Feb. 22, 1991 [JP] Japan .................. 3-028810
Feb. 26, 1991 [JP] Japan .................. 3-030904

[51] Int. Cl.6 .......................................... F16F 13/00
[52] U.S. Cl. .................... 267/140.14; 267/219; 267/140.15
[58] Field of Search ........... 267/140.1 AE, 140.1 A, 267/140.1 C, 140.1 R; 180/312, 902; 248/562, 636

[56] References Cited

U.S. PATENT DOCUMENTS

| | | | |
|---|---|---|---|
| 4,648,576 | 3/1987 | Matsui | 267/140.1 AE |
| 4,699,099 | 10/1987 | Arai et al. | 267/140.1 AE |
| 4,700,933 | 10/1987 | Chikamori et al. | 267/140.1 AE |
| 4,724,926 | 2/1988 | Koga et al. | 267/140.1 C |
| 4,789,143 | 12/1988 | Smith et al. | 267/140.14 |
| 4,858,899 | 8/1989 | Saotome et al. | 267/140.12 |
| 4,889,326 | 12/1989 | Bouhours | 267/140.14 |
| 5,123,635 | 6/1992 | Bouhours | 267/140.1 AE |
| 5,139,241 | 8/1992 | Hamaekers et al. | 267/140.12 |

FOREIGN PATENT DOCUMENTS

| | | | |
|---|---|---|---|
| 0017440 | 1/1987 | Japan | 267/219 |
| 62-101935 | 5/1987 | Japan | |
| 62-101936 | 5/1987 | Japan | |

*Primary Examiner*—Robert J. Oberleitner
*Assistant Examiner*—Chris Schwartz
*Attorney, Agent, or Firm*—Oliff & Berridge

[57] ABSTRACT

A vibration isolation apparatus comprises an outer cylinder connected to one of a vibration producing portion and a vibration receiving portion, an inner cylinder connected to the other of the vibration producing portion and the vibration receiving portion, and an elastic member which is disposed between the outer cylinder and the inner cylinder and which deforms when vibration is generated. The vibration isolation apparatus further comprises a unit having both a plurality of restricted paths and a rotary apparatus able to open and close at least one of the restricted paths. Thus, the restricted paths and the rotary apparatus are housed in a unit. As a result, assembly of the vibration isolation apparatus can be improved.

7 Claims, 9 Drawing Sheets

VIBRATION ISOLATION APPARATUS

BACKGROUND OF THE INVENTION

1. Field of the Invention

The present invention relates to a vibration isolation apparatus provided for a vehicle, in particular, for an engine mount and other such parts of the vehicle, to absorb vibration from a vibration producing portion.

2. Description of the Related Art

A vibration isolation apparatus is disposed in the vehicle engine as an engine mount between an engine and a vehicle body. The vibration isolation apparatus impedes the transmission of vibration from the engine to the vehicle body. The engine vibrates in various modes of vibration. For example, a shake vibration is generated when the vehicle is traveling at speeds of about 70 km/h, and an idle vibration is generated when the engine idles or the vehicle is traveling at speeds of about 5 km/h. In general, the frequency range of the idle vibration is 20 to 40 Hz while that of the shake vibration is less than 15 Hz. Therefore, the shake vibration and the idle vibration have different frequencies.

A fluid filled-type vibration isolation apparatus, is disclosed in Japanese Patent Application Laid-Open No. 62-101935 as a vibration isolation apparatus which can effectively absorb vibrations of such a wide range of frequencies.

This vibration isolation apparatus is equipped with a main fluid chamber and an auxiliary fluid chamber which are filled with fluid in an outer cylinder. The main fluid chamber and the auxiliary fluid chamber communicate with each other through a through-path having a small diameter and a through-path having a large diameter. The main fluid chamber and the auxiliary fluid chamber always communicate with each other through the through-path having a small diameter. In addition, the main fluid chamber and the auxiliary chamber communicate through the through-path having a large diameter via an opening and closing valve which is provided on an outer periphery of the outer cylinder.

When the engine vibrates at a low frequency, the opening and closing valve is closed, and the fluid flows back and forth only through the through-path having a small diameter. Therefore, the vibration can be absorbed by flow resistance which is generated when the fluid flows through the through-path having a small diameter. On the other hand, since the through-path having a small diameter is blocked when the engine vibrates at a high frequency, the opening and closing valve is opened so that the fluid flows through the through-path having a large diameter. As a result, resonance of the fluid is caused in the through-path having a large diameter to decrease a dynamic spring constant of the vibration isolation apparatus and absorb the vibration.

However, since the through-paths and the opening and closing valve, which opens and closes the through-paths, are provided separately for the vibration isolation apparatus, they must be assembled onto the outer cylinder after they are assembled separately. Accordingly, assembly becomes complicated, and it is difficult to make the whole vibration isolation apparatus compact.

SUMMARY OF THE INVENTION

In view of the facts set forth above, it is an object of the present invention to provide a vibration isolation apparatus which is small in size and can be assembled efficiently.

The vibration isolation apparatus of the present invention comprises a first member connected to one of a vibration producing portion and a vibration receiving portion, a second member connected to the other of the vibration producing portion and the vibration receiving portion, an elastic member provided between the first member and the second member and deforming when vibration is generated, a main fluid chamber having the elastic member as a part of a wall thereof and able to expand and contract, an auxiliary fluid chamber separated from the main fluid chamber, and a unit, provided between the first member and the second member, having a plurality of restricted paths communicating with the main fluid chamber and the auxiliary fluid chamber, and having a restricting means which can restrict a flow of fluid in at least one of the restricted paths.

Vibration transmitted from the vibration producing portion can be transmitted the vibration receiving portion through the first member, the elastic member, and the second member. However, most of the vibration can be absorbed by friction resistance in the elastic member, and can be further absorbed by flow resistance and resonance of the fluid which are generated between the main fluid chamber and the auxiliary chamber.

The vibration isolation apparatus has a plurality of restricted paths, and at least one of the restricted paths can be restricted by the restricting means. Thus, the vibration isolation apparatus can absorb vibrations of various frequencies. Namely, when vibration of a comparatively low frequency is generated, a sectional area of a restricted path is reduced and a length of the path is elongated. Accordingly, the vibration can be effectively absorbed by flow resistance which is generated when the fluid flows through the restricted path. Therefore, for example, a flow of the fluid is restricted by the restricting means in the restricted path in which the flow of the fluid can be limited. Additionally, the vibration can be absorbed by the other restricted paths, that is, the restricted paths with small sectional areas and no restricting means which directly communicate with the main fluid chamber and the auxiliary chamber. Further, when vibration of a high frequency is generated, the restricted paths with small sectional areas are blocked. Thus, the restricted path having a large effective sectional area must be used. In this case, for example, the restricted path allows the fluid to flow through the restricted path in which the flow of the fluid can be limited by the restricting means, and the effective sectional area of the restricted path is enlarged. Consequently, resonance of the fluid is caused in the restricted path to decrease a dynamic spring constant and damp the high frequency vibration.

Further, since the restricted paths and the restricting means are housed in one unit, it is not necessary to assemble the restricted paths and the restricting means separately and assemble them between the first member and the second member. Therefore, assembly of the vibration isolation apparatus becomes very efficient. Further, when the first member comprises the outer cylinder and the second member comprises an inner cylinder arranged inside the outer cylinder, the unit having the restricting means is provided in the outer cylinder. Accordingly, the whole vibration isolation apparatus can be made more compact.

According to one embodiment of the present invention, the restricting means may employ an opening and closing means for opening and closing at least one of the restricted paths. The opening and closing means may be designed so as to rotate about its axis in order to open and close at least one. Further, according to the other embodiments of the present invention, the opening and closing means may comprise a body of revolution such as a rotor. In addition, the body of revolution may be designed so as to open and close a plurality of restricted paths.

Each sectional area of a plurality of the restricted paths may be appropriately adjusted to correspond to the frequency of the vibration to be absorbed.

As described above, the vibration isolation apparatus of the present invention has the above construction, and has excellent effects in that it can be made compact and in that it can be assembled efficiently.

DESCRIPTION OF THE PREFERRED EMBODIMENTS

Figure 1:
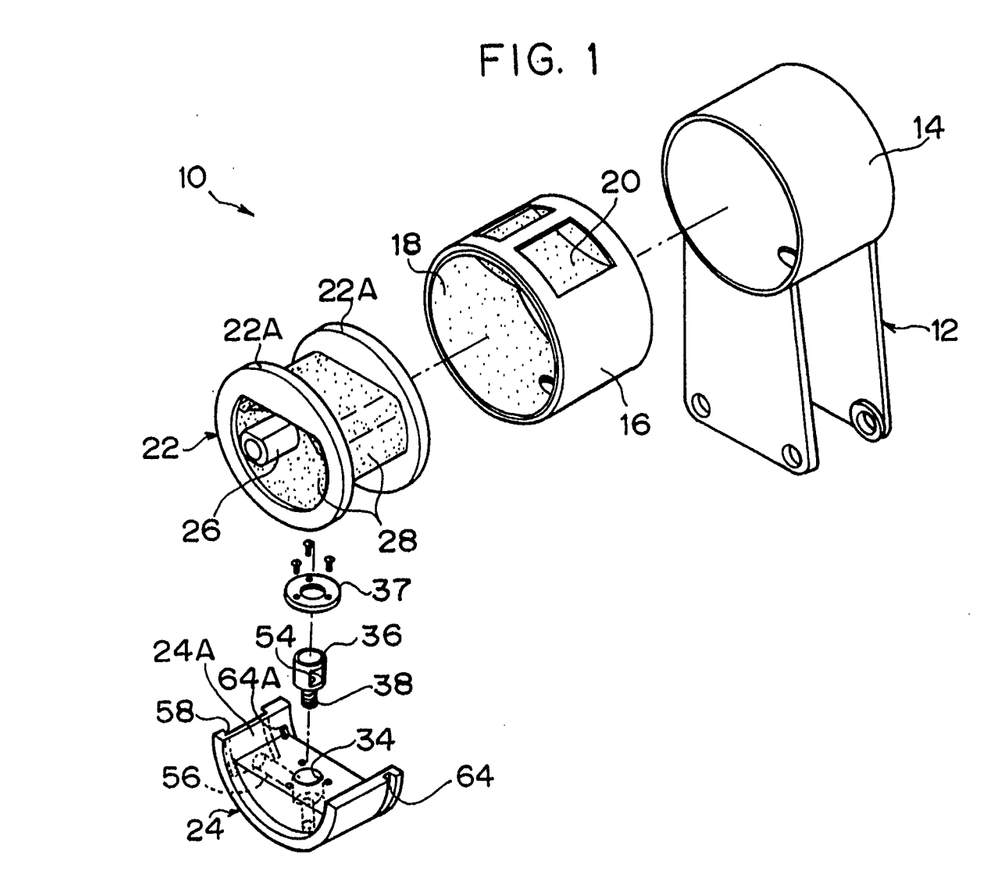
FIG. 1 is a perspective view illustrating a first embodiment of a vibration isolation apparatus of the present invention.
Figure 2:
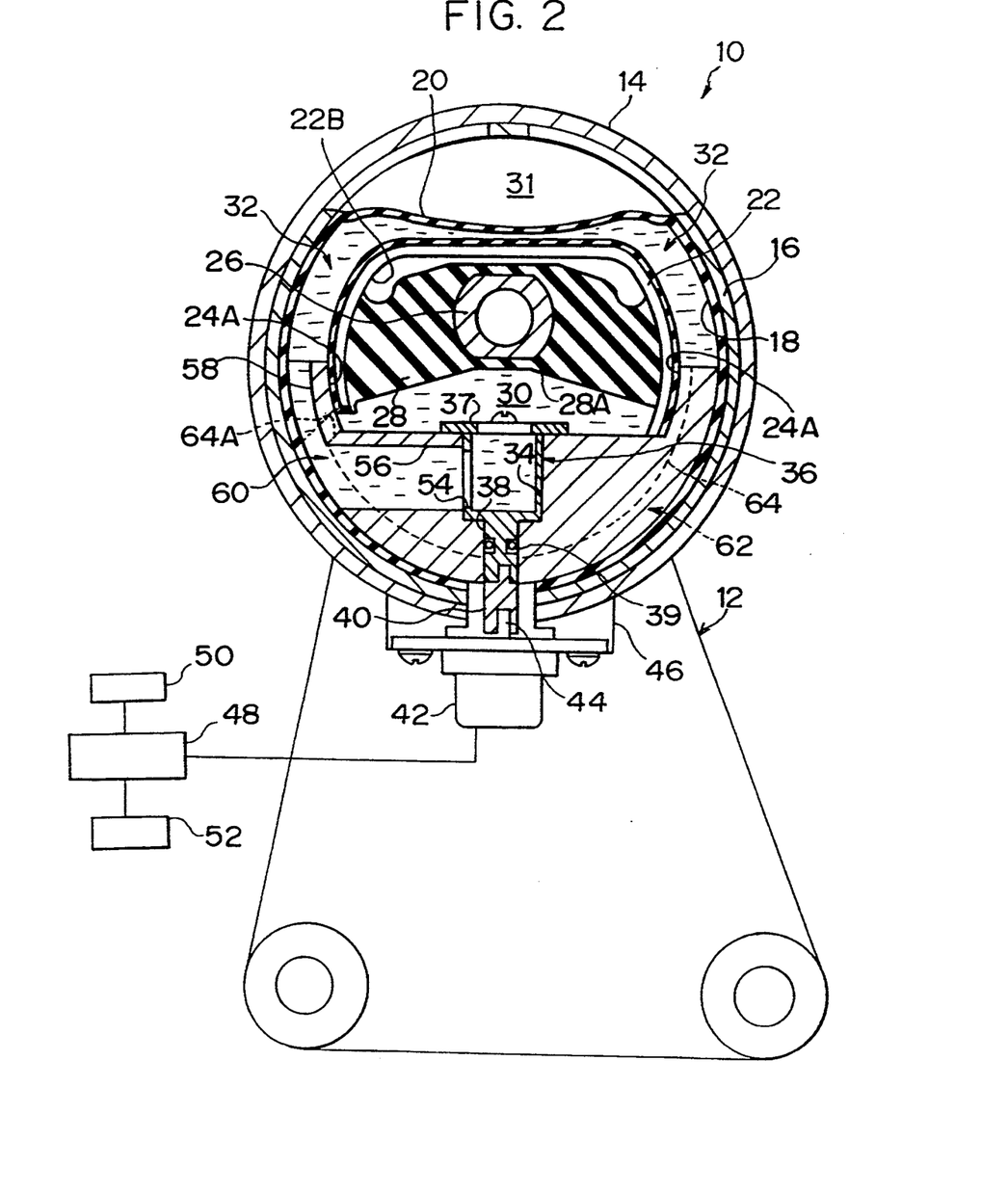
FIG. 2 is a partial sectional view illustrating the first embodiment of the vibration isolation apparatus.
Figure 3:
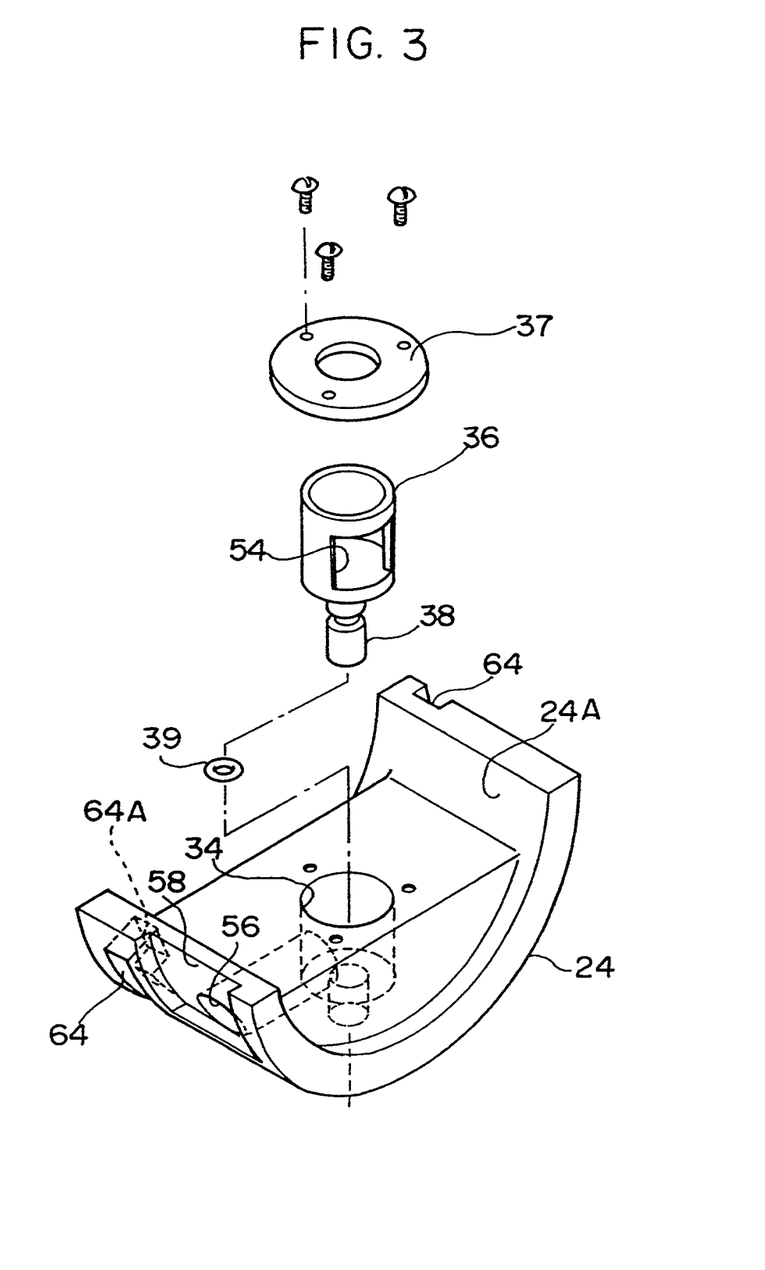
FIG. 3 is an exploded perspective view illustrating a unit of the first embodiment.

Referring to FIGS. 1 to 3, an embodiment of a vibration isolation apparatus 10 of the present invention will be described.

As shown in FIGS. 1 and 2, the vibration isolation apparatus 10 has a mounting frame 12 which is used for mounting the vibration isolation apparatus 10 on a vehicle body (not shown). An outer cylinder 16 is inserted into an annular portion 14 of the mounting frame 12. A thin rubber membrane 18 is bonded by vulcanization to the inner periphery of the outer cylinder 16. A part of the thin rubber membrane 18 separated from the inner periphery of the outer cylinder 16 is defined as a diaphragm 20. Further, an intermediate block 22 and an intermediate block 24, which comprises a unit, are inserted into the outer cylinder 16. The intermediate block 24 has a block shape which is substantially semicircular as viewed in an axial direction of the outer cylinder 16. The outer periphery of the intermediate block 24 is bonded to the inner periphery of the thin rubber membrane 18. Flange portions 22A are provided at respective axial ends of the intermediate block 22. The outer periphery of the intermediate block 22 is bonded to the inner periphery of the thin-rubber membrane 18. The intermediate block 24 is fitted between the flange portions 22A. The intermediate block 22 has a cut-out portion 22B at a center portion where it faces the intermediate block 24. An inner cylinder 26 extends through the cut-out portion 22B. The inner cylinder 26 is arranged coaxially with the outer cylinder 16, and a main rubber body 28, serving as an elastic member, is disposed between the inner cylinder 26 and the intermediate block 22. Thus, the inner cylinder 26 can be moved relatively with respect to the outer cylinder 16.

A part of an outer periphery of the main rubber body 28 is bonded to a top surface 24A of the intermediate block 24. A cut-out portion 28A is formed at a part of an intermediate portion between the main rubber body 28 and the intermediate block 24 to define a main fluid chamber 30. Further, an auxiliary fluid chamber 32 is defined between flange portions 22A of the intermediate block 22. The intermediate block 22 serves as an inner periphery of the auxiliary fluid chamber 32, and the thin rubber membrane 18 and the diaphragm 20 serve as an outer periphery thereof. An air chamber 31 is defined between the diaphragm 20 and the outer cylinder 16 and communicates with the outside when necessary. The main fluid chamber 30 and the auxiliary fluid chamber 32 are filled with fluid such as water or oil.

The intermediate block 24 has a circular hole 34 which faces the main fluid chamber 30 and extends in the radial direction of the outer cylinder 16. A rotor 36 serving as a restricting means is inserted so as to be rotatable with the circular hole 34. The rotor 36 has a smaller diameter shaft 38 extending through the intermediate block 24. A ring washer 37 is screwed to an open portion of the circular hole 34 of the intermediate block 24 and keeps the rotor 36 from coming out. An O ring 39 is fitted at an intermediate portion on the small diameter shaft 38 of the rotor 36 and impedes leakage of the fluid. On the other hand, an end of the small diameter shaft 38 is connected through a coupling 40 to a rotary shaft 44 of a motor 42. The motor 42 is screwed to a boss 46 which is fixed on the annular portion 14 of the mounting frame 12. Rotation of the motor 42 is controlled by a controlling means 48. The controlling means 48 is driven by a power source of the vehicle and receives signals detected from at least a vehicle speed sensor 50 and an engine speed sensor 52 in order to detect the vehicle speed and the engine speed.

The rotor 36 has a cylindrical end portion facing the main fluid chamber 30. A through-hole 54 is provided in a portion of a periphery of the cylinder and can be connected to a path 56 which is formed in the intermediate block 24 in the radial direction of the circular hole 34. The path 56 is connected to a path 58 which is defined on the outer periphery of the intermediate block 24. The path 58 is connected to the auxiliary fluid chamber 32. The paths 56, 58 are used as an idle orifice 60, serving as a restricted path, and can be connected to or disconnected from the main fluid chamber 30 depending on the rotation of the rotor 36.

A path 64 is formed on the outer periphery of the intermediate block 24 to provide a shake orifice 62, serving as a restricted path. As shown in FIG. 2, one end of the path 64 passing around the inner cylinder 26, is connected to the auxiliary fluid chamber 32 on the side opposite the path 58, and the other end is connected to the main fluid chamber 30 through an opening 64A which is defined in the inner periphery of the intermediate block 24 (see FIGS. 1 and 2). Therefore, the main fluid chamber 30 and the auxiliary fluid chamber 32 are always connected through the path 64.

Operation of the embodiment will be described hereinafter.

When the vehicle is traveling at high speeds, for example, speeds greater than or equal to 70 to 80 km/h, shake vibration (less than 15 Hz) is generated. The controlling means 48 determines, from the vehicle speed sensor 50 and the engine speed sensor 52, whether or not shake vibration is generated. If the controlling means 48 determines that shake vibration is generated, the controlling means 48 causes the motor 42 to drive to rotate the rotor 36 so that the through-hole 54 is positioned so as to not correspond to the path 56. Thus, the path 56 is closed, and the main fluid chamber 30 and the auxiliary chamber 32 are connected only through the shake orifice 62. Therefore, variation in pressure is generated in the main fluid chamber 30 due to the engine vibration, and meets with resistance of fluid flowing through the shake orifice 62. As a result, the shake vibration is absorbed.

In addition, when the engine idles or the vehicle is traveling at speeds less than or equal to 5 km/h, idle vibration (20 to 40 Hz) is generated. The controlling means 48 determines, from the vehicle speed sensor 50 and the engine speed sensor 52, whether or not idle vibration is generated. If the controlling means 48 determines that idle vibration is generated, the controlling means 48 causes the motor 42 to drive to rotate the rotor 36 so that the through-hole 54 of the rotor 36 is connected to the path 56. Thus, even if the shake orifice 62 is blocked, the fluid can flow back and forth between the main fluid chamber 30 and the auxiliary fluid chamber 32 through the idle orifice 60 having little flow resistance. As a result, resonance of the fluid is caused in the idle orifice 60 to decrease the dynamic spring constant.

Further, the vibration isolation apparatus 10 has the intermediate block 24 which is used both as a member to form the paths 55, 58, and 64, and as a member to support the rotor 36 serving as a restricting means. Accordingly, as compared with a case in which members are provided separately for each of the above purposes, the number of parts can be reduced in the vibration isolation apparatus. Therefore, assembly becomes easier since only one unit has to be fitted on the outer cylinder. Further, the fluid paths and the restricting means for restricting the fluid flowing through the paths are all provided within the outer cylinder so that the whole vibration isolation apparatus can be made more compact. Moreover, the fluid paths all being provided within the outer cylinder ensures reliability in avoiding leakage of the fluid.

In this embodiment, the vibration isolation apparatus 10 comprises two restricted paths, namely, the idle orifice 60 and the shake orifice 62. The present invention, however, should not be limited to this embodiment, and may employ any number of restricted paths, as long as there is a plurality of paths.

Further, in this embodiment, the fluid flowing through the idle orifice 60 is restricted by the rotor 36. The present invention, however, should not be limited to this and may employ another type of restricting means, such as a spool valve or a ball valve, in order to restrict the fluid flowing through the idle orifice 60.

A second embodiment of the present invention will be described hereinafter.

Figure 5:
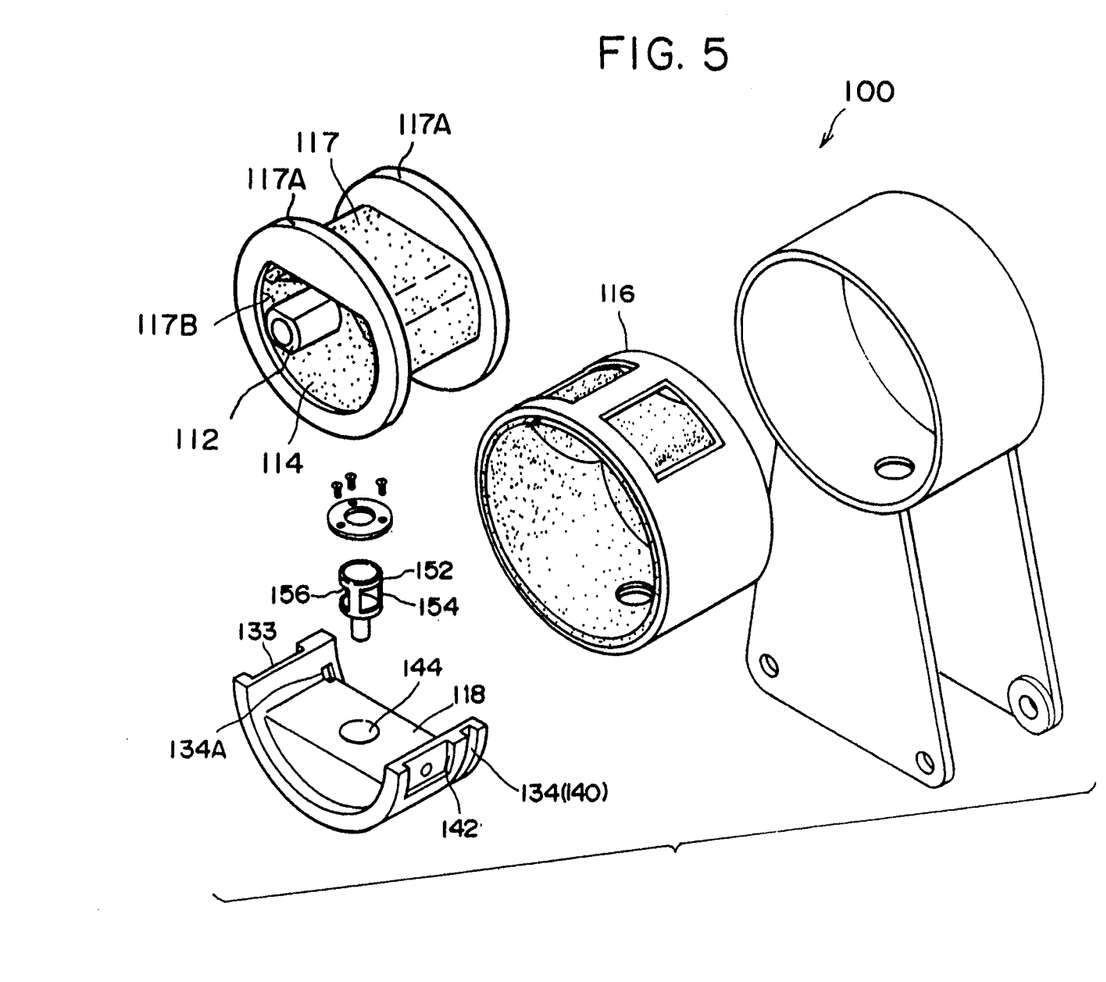
FIG. 5 is an exploded perspective view illustrating essential parts of FIG. 4.

FIG. 5 is an exploded perspective view illustrating the second embodiment of a vibration isolation apparatus 100.

Figure 4:
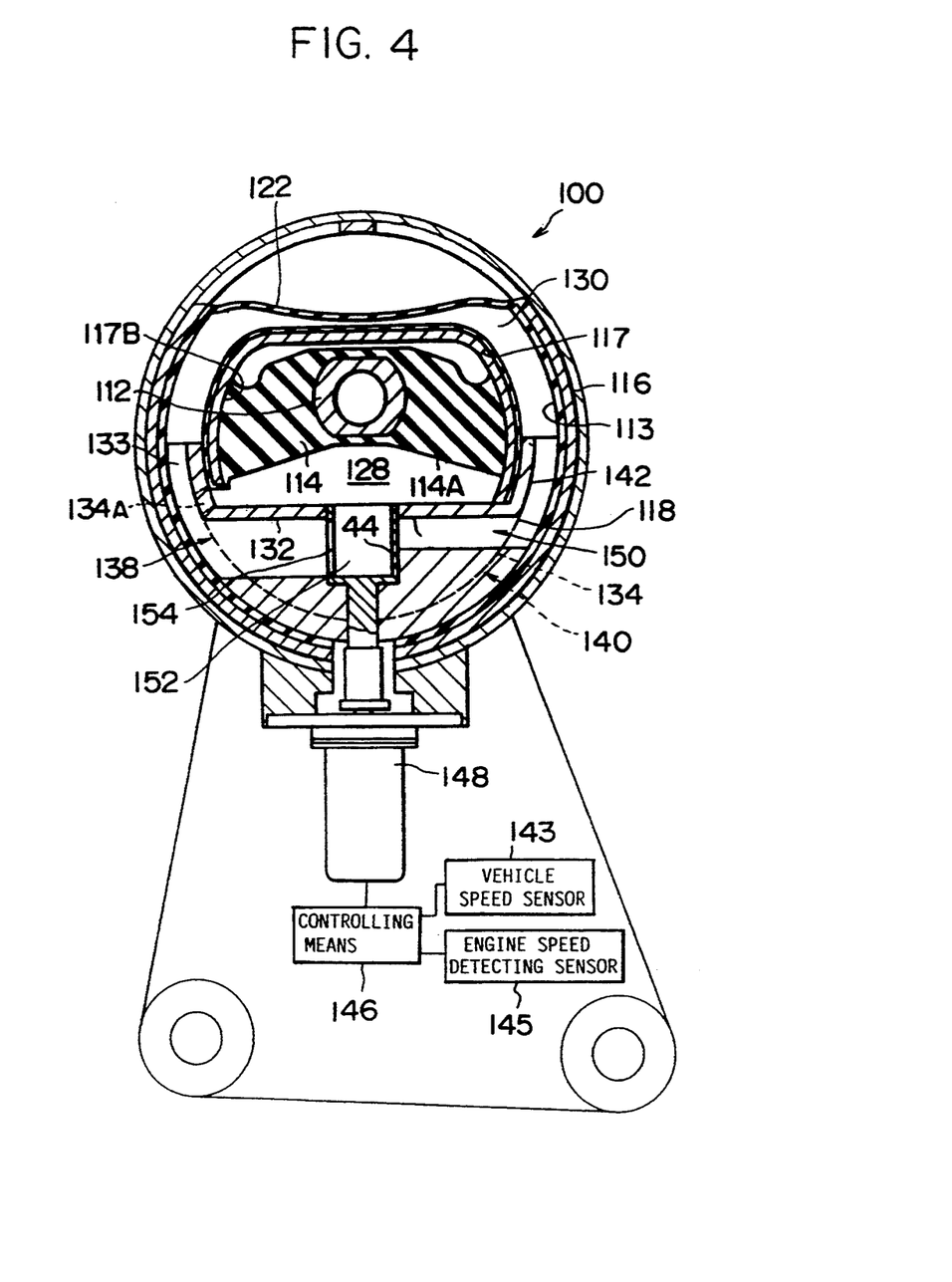
FIG. 4 is a sectional view illustrating a second embodiment of a vibration isolation apparatus of the present invention.

The vibration isolation apparatus 100 has an inner cylinder 112. As shown in FIG. 4, an outer cylinder 116 is arranged in parallel axial relationship with the inner cylinder 112. In this embodiment, the inner cylinder 112 is connected via a bracket to an engine (not shown) serving as a vibration producing portion. Further, the outer cylinder 116 is connected via a bracket to a vehicle body (not shown) serving as a vibration receiving portion.

A thin rubber membrane 113 is bonded by vulcanization to the inner periphery of the outer cylinder 116. A part of the thin rubber membrane 113 separated from the inner periphery of the outer cylinder 116 is defined as a diaphragm 122. Further, intermediate blocks 117, 118 are inserted into the outer cylinder 116.

The intermediate block 118 has a block shape which is substantially semicircular as viewed in the axial direction of the outer cylinder 116. The outer periphery of the intermediate block 118 is bonded to the inner periphery of the thin rubber membrane 113. Annular flange portions 117A are provided at both axial ends of the intermediate block 117. The outer periphery of the intermediate block 117 is bonded to the inner periphery of the thin rubber membrane 113. The intermediate block 118 is fitted between the flange portions 117A. The intermediate block 117 has a cut-out portion 117B at a center portion where the intermediate block 117 faces the intermediate block 118. The inner cylinder 112 extends through the cut-out portion 117B. A main rubber body 114 is disposed between the inner cylinder 112 and the intermediate block 117. Thus, the inner cylinder 112 can be moved relatively with respect to the outer cylinder 116. The main rubber body 114 is bonded by vulcanization to a top surface of the intermediate block 118. A cut-out portion 114A is formed at a part of an intermediate portion between the main rubber body 114 and the intermediate block 118 to define a main fluid chamber 128. Further, an auxiliary fluid chamber 130 is defined between flange portions 117A of the intermediate block 117. The intermediate block 117 serves as an inner periphery of the auxiliary fluid chamber 130, and the thin rubber membrane 113 and the diaphragm 122 serve as an outer periphery thereof. The main fluid chamber 128 and the auxiliary fluid chamber 130 are filled with fluid such as water or oil.

Figure 6:
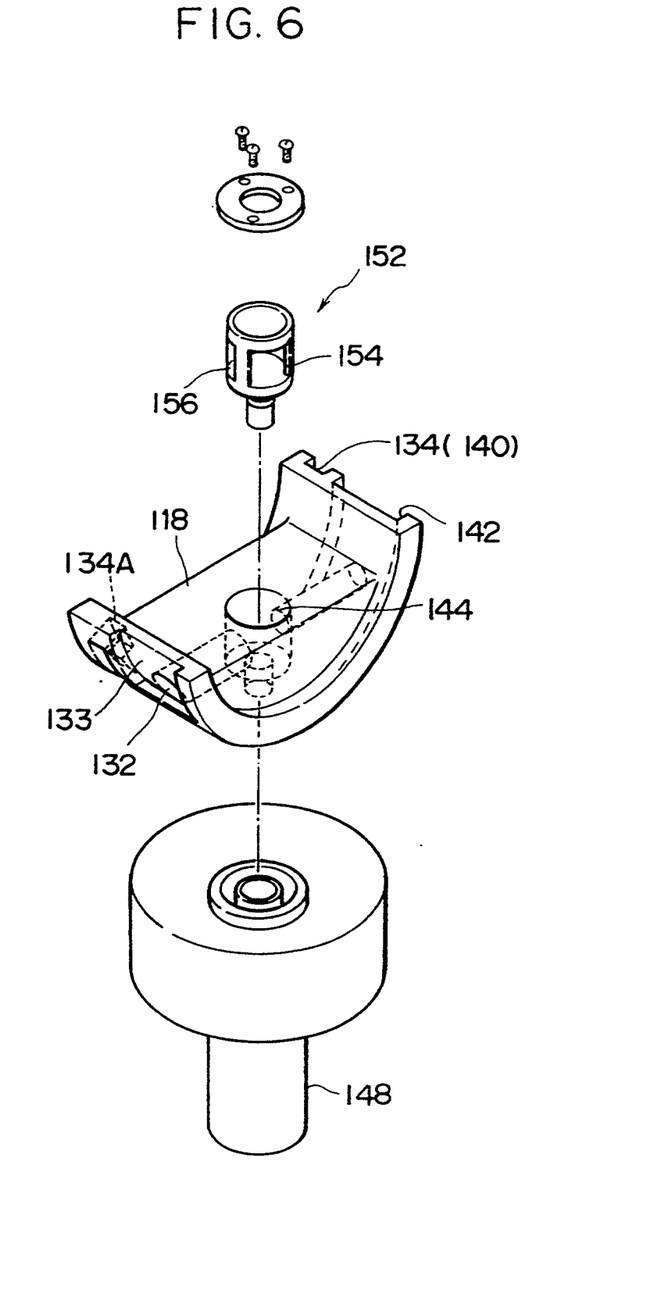
FIG. 6 is an exploded perspective view illustrating the second embodiment of an intermediate block and a motor.

The intermediate block 118 has a circular hole 144 which faces the main fluid chamber 128 and extends in the radial direction of the outer cylinder 116. In addition, the intermediate block 118 has paths 132, 136 which extend outwardly in the radial direction of the circular hole 144. One end of the path 132 is connected to the circular hole 144, and the other end is connected to a path 133 which is provided on the outer periphery of the intermediate block 118. The path 133 communicates with the auxiliary fluid chamber 130. One end of the path 136 is connected to the circular hole 144, and the other end is connected to a path 142 which is provided on the outer periphery of the intermediate block 118. The path 142 communicates with the auxiliary fluid chamber 130. The path 132 has a larger sectional area (referred to as "path sectional area" in the following discussion) in the direction perpendicular to the longitudinal direction (the direction of flow of the fluid) than that of the path 136. In this embodiment, the path 132 has enough path sectional area to effectively absorb idle vibrations of a high frequency range (15 to 30 Hz), and serves as an idle orifice 138. The path 136 has enough path sectional area to effectively absorb idle vibrations of a higher frequency range (30 to 50 Hz), and also serves as an idle orifice 150.

A rotor 152 is inserted into the circular hole 144, extends through the outer cylinder 116 and can be rotated by receiving a driving force generated by a motor 148 which is mounted on the outer periphery of the outer cylinder 116. The motor 148 is connected to a controlling means 146. The controlling means 146 is connected to a vehicle speed sensor 143, which detects the vehicle speed, and an engine speed on sensor 145, which detects the engine speed.

Figure 7A:
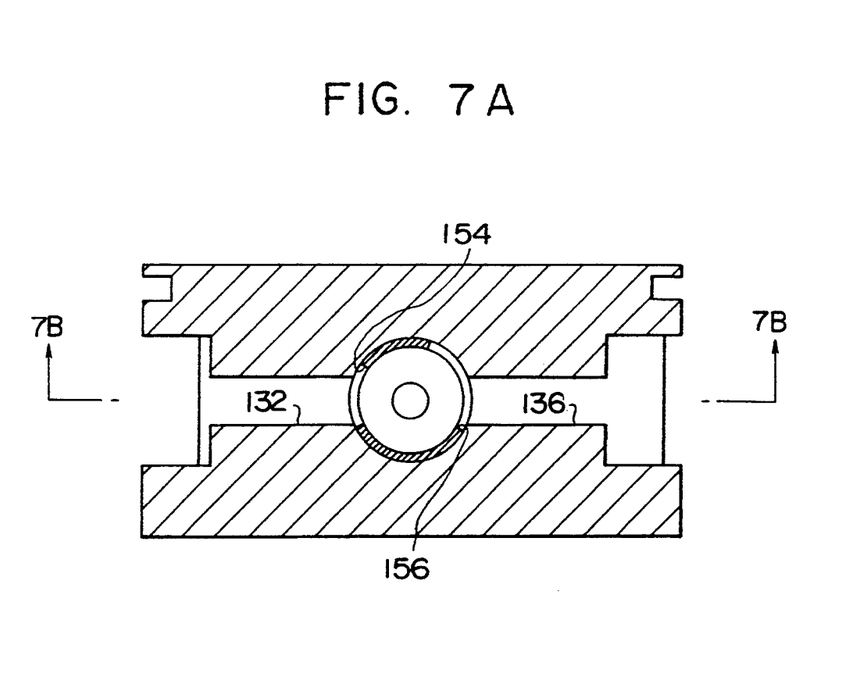
FIG. 7A is a sectional view taken along line 7A—7A of FIG. 7B, illustrating the intermediate block.
Figure 7B:
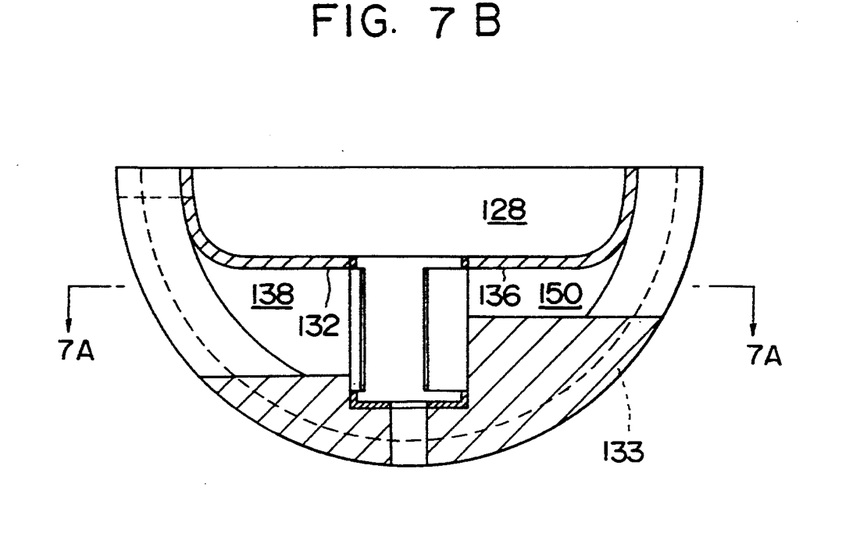
FIG. 7B is a sectional view taken along line 7B—7B of FIG. 7A.
Figure 8A:
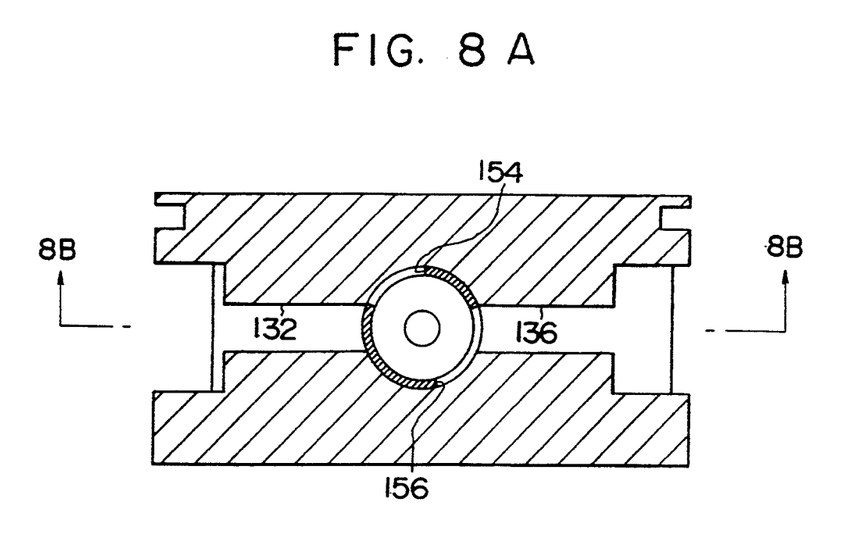
FIG. 8A is a sectional view taken along line 8A—8A of FIG. 8B, illustrating the intermediate block.
Figure 8B:
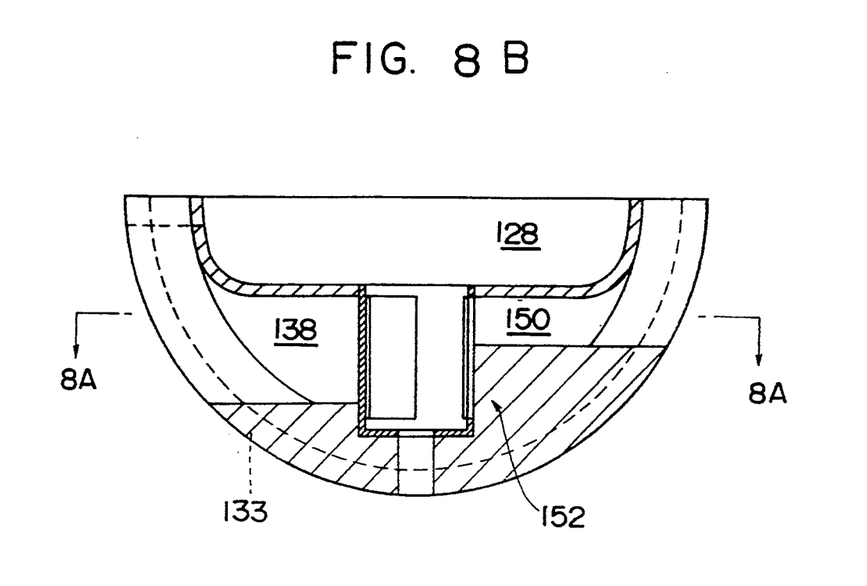
FIG. 8B is a sectional view taken along line 8B—8B of FIG. 8A.
Figure 9A:
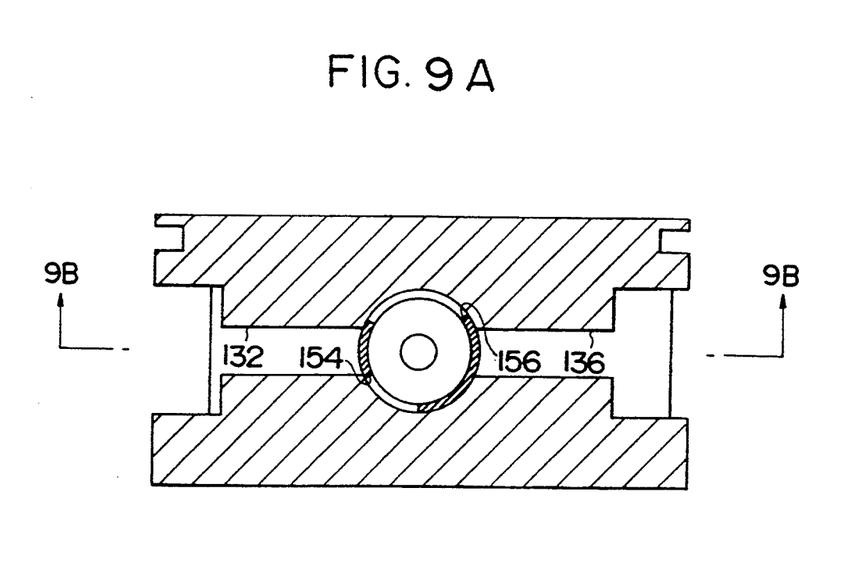
FIG. 9A is a sectional view taken along line 9A—9A of FIG. 9B, illustrating the intermediate block.
Figure 9B:
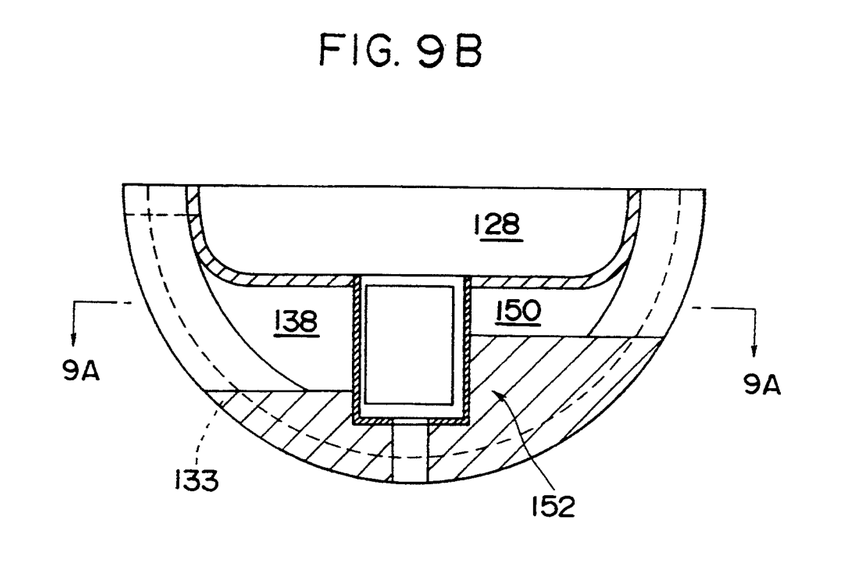
FIG. 9B is a sectional view taken along line 9B—9B of FIG. 9A.

The rotor 152 has a cylindrical end portion facing the main fluid chamber 128. As shown in FIGS. 7A through 9B, a through-hole 154 and a through-hole 156, whose area is larger than that of the through-hole 154, are formed in parts of the periphery of the cylinder defining a plurality of restricting means. The through-holes 154, 156 are arranged at positions such that the paths 132 and 136 may be in a connected state (as shown in FIGS. 7A, 7B), or only the path 136 may be in a connected state (as shown in FIGS. 8A, 8B), or the paths 132 and 136 are in a disconnected state (as shown in FIGS. 9A, 9B), depending on the rotary position of the rotor 152.

Further, a path 134, which forms a shake orifice 140, is provided on the outer periphery of the intermediate block 118. One end of the path 134, passing around the inner cylinder 112, communicates with the auxiliary fluid chamber 130 on the side opposite the path 133, and communicates with the main fluid chamber 128 via an opening 134A (see FIG. 5), which is provided on the inner periphery of the intermediate block 118. Therefore, the main fluid chamber 128 and the auxiliary fluid chamber 130 always communicate via the path 134. The path 132 has a path sectional area larger than that of the path 136.

An air chamber is defined between the diaphragm 122 and the outer cylinder 116 and communicates with the outside when necessary.

Operation of the embodiment will be described hereinafter.

When the vehicle is traveling at high speeds, for example, speeds greater than or equal to 70 to 80 km/h, shake vibration (less than 15 Hz) is generated. The controlling means 146 determines, from the vehicle speed sensor 143 and the engine speed sensor 145, whether or not shake vibration is generated. If the controlling means 146 determines that shake vibration is generated, the motor 148 is controlled such that the rotor 152 is set in a condition such as that shown in FIGS. 9A, 9B. Namely, the path 132 and the path 136 are in the disconnected state due to the position of the outer periphery of the rotor 152.

Consequently, the fluid cannot flow back and forth between the main fluid chamber 128 and the auxiliary fluid chamber 130 through the idle orifices 138, 150. Therefore, the fluid flows back and forth between the main fluid chamber 128 and the auxiliary fluid chamber 130 only through the shake orifice 140. As a result, flow resistance or resonance of the fluid when the fluid flows through the shake orifice 140 absorbs the shake vibration.

If an air-conditioner is turned on when the engine is idling, idle vibration of a low frequency range (15 to 30 Hz) is generated. The controlling means 146 determines, from on the vehicle speed sensor 143 and the engine speed sensor 145, whether or not idle vibration of a low frequency range is generated. If the controlling means 146 determines that idle vibration of a low frequency range is generated, the motor 148 is controlled such that the rotor 152 is set in a condition such as that shown in FIGS. 8A, 8B. Namely, the path 136 is in the connected state through the through-hole 156, and the path 132 is in the disconnected state due to the position of the outer periphery of the rotor 152.

Consequently, the fluid cannot flow back and forth between the main fluid chamber 128 and the auxiliary fluid chamber 130 through the idle orifice 138. Additionally, in this state, the shake orifice 140 is set in a blocked condition. Accordingly, the fluid flows back and forth through the idle orifice 150 between the main fluid chamber 128 and the auxiliary fluid chamber 130. As a result, flow resistance or resonance of the fluid when the fluid flows through the idle orifice 150 absorbs idle vibration of a comparatively low frequency.

On the other hand, if an air-conditioner is turned off when the engine is idling, idle vibration of a higher frequency range (30 to 50 Hz) than the above-mentioned idle vibration is generated. The controlling means 146 determines, from on the vehicle speed sensor 143 and the engine speed sensor 145, whether or not idle vibration of a high frequency range is generated. If the controlling means 146 determines that idle vibration of a high frequency range is generated, the motor 148 is controlled such that the rotor 152 is set in a condition such as that shown in FIGS. 7A, 7B. Namely, the path 132 and the path 136 communicate with the main fluid chamber 128 through the through-holes 154, 156.

In this case, since idle vibration of a high frequency range is generated, the shake orifice 140 and the idle orifice 150 are set in a blocked condition. Accordingly, the fluid flows back and forth only through the idle orifice 138. Flow resistance or resonance of the fluid when the fluid flows through the idle orifice 138 absorbs the idle vibration of a high frequency range. In this embodiment, the path 136 is provided to absorb idle vibration of a high frequency range, and flow resistance or resonance of the fluid when the fluid flows through the path 136 absorbs the idle vibration of a high frequency range. Therefore, idle vibration of a high frequency range can be sufficiently absorbed. In addition, in this embodiment, an end of each of the paths 132, 136 is connected to the circular hole 144, and the rotor 152, which is provided with the through-holes 154, 156, is positioned in the circular hole 144 as described above. The paths 132, 136 can be placed in a connected state or a disconnected state by a single rotor 152. Therefore, the vibration isolation apparatus 100 does not require a complex construction.

In this embodiment, three paths are provided to switch the respective paths used for absorbing vibration depending on the frequencies of the vibrations. However, three or more paths may be employed to switch the respective paths depending on the frequencies of the vibrations. It is thereby possible to absorb vibrations of a wider range of frequencies.

Further, in this embodiment, when idle vibration of a high frequency range is generated, the path 136 is in a connected state. The path 136, however, may be closed and may be placed in a disconnected state on purpose.

In addition, in this embodiment, the shake orifice 140 has a smaller path sectional area than that of the idle orifice 150, and the idle orifice 150 has a smaller path sectional area than that of the idle orifice 138. However, the respective sizes of the path sectional areas may be equal or the sizes of the sectional areas may be varied in any order of the respective paths.

According to this embodiment, the vibration isolation apparatus comprises the first through third restricted paths and opening and closing members which are controlled by the controlling means so as to be able [o open and close these restricted paths. As a result, an excellent effect can be obtained in that the vibration ,isolation apparatus can absorb vibrations of a wide range of frequencies without complex construction of the apparatus.

What is claimed is:

1. A vibration isolation apparatus comprising:
    a first member connected to one of a vibration producing portion and a vibration receiving portion and comprising an outer cylinder;
    a second member connected to the other of the vibration producing portion and the vibration receiving portion and comprising an inner cylinder axially penetrating inside said outer cylinder;
    an elastic member provided between said outer and inner cylinders, and deforming when vibration is generated such that said inner cylinder is movable relative to said outer cylinder;
    a main fluid chamber provided adjacent said elastic member and able to expand and contract;
    an auxiliary fluid chamber separated from said main fluid chamber;
    a unit comprising first and second intermediate blocks having a plurality of restricted paths communicating with said main fluid chamber and said auxiliary fluid chamber, and at least one restricting means for restricting a flow of fluid in at least one but not all of said restricted paths, said restricting means comprising a rotary member rotatable about an axis thereof so as to open and close at least one but not all of said restricted paths, said unit being provided inside said outer cylinder and said auxiliary fluid chamber and said main fluid chamber being arranged at different positions on a circumferential surface of said inner cylinder; and
    a controlling means for controlling said rotary member depending on a frequency of vibration generated from the vibration producing portion.

2. The vibration isolation apparatus according to claim 1, wherein said unit is provided with a plurality of said restricting means.

3. The vibration isolation apparatus according to claim 1, wherein said plurality of restricted paths includes a first restricted path having a larger sectional area and a second restricted path having a smaller sectional area, and said restricting means being provided for said first restricted path.

4. The vibration isolation apparatus according to claim 1, further comprising rotating means for rotating said rotary member about said axis by means of operation of the rotating means.

5. The vibration isolation apparatus according to claim 4, wherein said controlling means further comprises a control unit effecting operation of said rotating means based on at least both a vehicle speed of a vehicle equipped with the vibration isolation apparatus and an engine speed of said vehicle.

6. The vibration isolation apparatus according to claim 1, wherein said restricted paths comprise a first restricted path, a second restricted path, and a third restricted path, and said rotary member is arranged so as to be able to open and close said second restricted path and third restricted path, and said controlling means controls said opening and closing means between a first state in which said second restricted path and said third restricted path are closed, a second state in which said second restricted path is open and said third restricted path is closed, and a third state in which said second restricted path and said third restricted path are open, depending on a frequency of vibration generated from the vibration producing portion.

7. The vibration isolation apparatus according to claim 6, wherein one of said second restricted path and said third restricted path has a larger sectional area.

* * * * *